US007962328B2

(12) United States Patent
Corwin

(10) Patent No.: US 7,962,328 B2
(45) Date of Patent: Jun. 14, 2011

(54) METHOD AND APPARATUS FOR GENERATING A COMPACT DATA STRUCTURE TO IDENTIFY THE MEANING OF A SYMBOL

(75) Inventor: Daniel W. Corwin, Lenior City, TN (US)

(73) Assignee: Lexikos Corporation, Arlington, MA (US)

( * ) Notice: Subject to any disclaimer, the term of this patent is extended or adjusted under 35 U.S.C. 154(b) by 1095 days.

(21) Appl. No.: 11/685,505

(22) Filed: Mar. 13, 2007

(65) Prior Publication Data
US 2007/0213985 A1    Sep. 13, 2007

Related U.S. Application Data

(60) Provisional application No. 60/781,683, filed on Mar. 13, 2006.

(51) Int. Cl.
*G06F 17/27* (2006.01)
*G06F 17/20* (2006.01)
*G06F 17/28* (2006.01)

(52) U.S. Cl. .................................... 704/9; 704/1; 704/4
(58) Field of Classification Search .................... 704/1–9
See application file for complete search history.

(56) References Cited

U.S. PATENT DOCUMENTS

| | | | | | |
|---|---|---|---|---|---|
| 5,390,281 | A | * | 2/1995 | Luciw et al. | 706/11 |
| 5,505,359 | A | * | 4/1996 | Joecker, Jr. | 225/96.5 |
| 5,523,946 | A | * | 6/1996 | Kaplan et al. | 704/2 |
| 5,721,938 | A | * | 2/1998 | Stuckey | 704/4 |
| 5,966,686 | A | * | 10/1999 | Heidorn et al. | 704/9 |
| 6,714,939 | B2 | * | 3/2004 | Saldanha et al. | 1/1 |
| 6,804,677 | B2 | * | 10/2004 | Shadmon et al. | 707/752 |
| 7,027,974 | B1 | * | 4/2006 | Busch et al. | 704/4 |
| 7,177,798 | B2 | * | 2/2007 | Hsu et al. | 704/9 |
| 7,610,191 | B2 | * | 10/2009 | Gao et al. | 704/9 |
| 2001/0053968 | A1 | * | 12/2001 | Galitsky et al. | 704/9 |
| 2002/0059069 | A1 | * | 5/2002 | Hsu et al. | 704/257 |
| 2004/0158455 | A1 | * | 8/2004 | Spivack et al. | 704/9 |
| 2005/0071150 | A1 | * | 3/2005 | Nasypny | 704/9 |
| 2005/0149510 | A1 | * | 7/2005 | Shafrir | 707/3 |
| 2006/0136194 | A1 | * | 6/2006 | Armstrong et al. | 704/4 |

OTHER PUBLICATIONS

Jarmasz et al. "Roget's thesaurus and semantic similarity", in a book "Recent advances in Natural Language Processing III", Published by John Benjamins Publishing Co. Netherlands, 2004.*
Uren et al. "Semantic annotation for knowledge managements: requirements and a survey of the state of the art", Journal of Web Semantics, Published by Elsevier B. V., 2005.*

(Continued)

*Primary Examiner* — James S Wozniak
*Assistant Examiner* — Jialong He
(74) *Attorney, Agent, or Firm* — Robert Plotkin, P.C.

(57) ABSTRACT

A computer-implemented method provides, to a user, representations of a plurality of discriminants of meanings of a plurality of symbols in a natural language. Each of the plurality of discriminants is associated with a corresponding finite set of mutually exclusive answers to the discriminant. The discriminants are orthogonal to each other. The method receives, from the user, input representing a plurality of answers to the plurality of discriminants. Each of the plurality of answers from the user is selected from the finite set of mutually exclusive answers to the corresponding discriminant. The method generates, in response to the input, a data structure tangibly stored in a computer-readable memory. The data structure includes data representing the plurality of answers from the user and thereby represents a meaning of one of the plurality of symbols in the natural language.

34 Claims, 3 Drawing Sheets

OTHER PUBLICATIONS

Reeve et al. "Survey of semantic annotation platforms", ACM symposium on applied computing, 2005.*

Cimiano et al. "Towards the self-annotating web", ACM, WWW2004, May 2004, New York.*

Katz et al. "Natural Language Annotations for the Semantic Web" In Proceedings of the International Conference on Ontologies, Databases, and Application of Semantics (ODBASE 2002), Oct. 2002.*

Handschuh et al. "CREAM . Creating relational metadata with a component-based, ontology driven framework", In Proceedings of K-Cap 2001, Victoria, BC, Canada, (Oct. 2001).*

Appendix Roleplay, www.lexikos.com, Jan. 15, 1990.

Ronald Bourret, Namespace Myths Exploded, XML.com, Mar. 8, 2000.

John F. Sowa, Thematic Roles, www.jfsowa.com, Jul. 4, 2001.

Oasis, Pubblished Subjects: Introduction & Basic Requirements, Jun. 24, 2003, Oasis.

Dan Corwin, Published Subject Indicators for Participant Types, www.lexikos.com, Aug. 19, 2004.

Tim Berners-Lee, et al., URI: Generic Syntax, The Internet Society Network Working Group, Jan. 2005.

DOI Data Model, International DOI Foundation, 2006.

Rector, et al., Simple Bio Upper Ontology, School of Computer Science, University of Manchester, Jan. 2006.

W3C Recomendation, Namespaces in XML 1.0 (Second Edition), www.w3.org/TR/2006/REC-XML-names-20060816, Aug. 16, 2003.

Faceted Classification, Wikipedia, http://en.wikipedia.org/wiki/faceted_classification, Feb. 4, 2007.

International Standard Book Number, Wikipedia, http://en.wikipedia.org/wiki/International_Standard_Book_Number, Mar. 11, 2007.

John F. Sowa, Top Level Categories, http://www.jfsowa.com/ontology/toplevel.htm, Aug. 28, 2001.

Dan Corwin, Case Frame Theory, www.lexikos.com, visited Mar. 13, 2007.

Roles are Added As Situations Get More Complex, www.lexikos.com, visited Mar. 13, 2007.

Other Example Ideas of Various Situations, www.lexikos.com, visited Mar. 13, 2007.

Proposed Case Role Hierarchy, www.lexikos.com, visited Mar. 13, 2007.

Bittner, et al., Individuals, Universals, Collections: On the Foundational Relations of Ontology, IFOMIS, Saarland University, Published 2004.

\* cited by examiner

METHOD AND APPARATUS FOR GENERATING A COMPACT DATA STRUCTURE TO IDENTIFY THE MEANING OF A SYMBOL

CROSS REFERENCE TO RELATED APPLICATIONS

This application claims priority from U.S. Provisional Patent Application Ser. No. 60/781,683, filed on Mar. 13, 2006, entitled "Charting Paragraph Topics," which is hereby incorporated by reference.

BACKGROUND

Related Art

Natural Language Processing (NLP) attempts to convert a grammatical stream of linguistic symbols (in either text or sound) into a corresponding stream of the ideas represented. Typically this involves the generation of parse trees—often called sentence diagrams—to show the structure of the clauses and phrases. Output is often expressed as a graph of nodes (representing terms or forms) connected by arcs representing their interrelationships.

Natural Language Understanding (NLU) extends such NLP analyses by assigning to each term, phrase and/or clause a formal model, also often phrased as graphs, of the thing(s) it symbolized in the mind of the speaker when it was generated. This model is taken as a representation of the "meaning" of each term and grammar form intended by the speaker. Finding it accurately is a central NLU goal.

Semantic Nets are graph-like data structures in the memory or display areas of a computer, often used to partially model such "intended meanings." They depict each meaning by using (1) a set of nodes symbolizing relevant topics and (2) arcs connecting them. The arcs symbolize the relations or associations between such nodes that were stated or queried in input, or assumed during processing.

Advocates of such modeling techniques often apply quite similar graph-like structures and conventions to model the meaning of identifiers for non-linguistic digital data objects, such as disk files or folders, web pages, images, sound streams, programs, XML nodes, database rows and columns, and software variables. The number of such identifiers in modern software is staggering.

Such graph-based general modeling resembles the modeling of "grammar form" meanings, except that the actual linguistic structures may only be in the head of the modeler, and otherwise missing. The emerging nodes and arcs, taken alone, are deemed adequate as representations of things. Each arc has one node at either end, so these descriptive structures are often called "triples."

Software tools and languages for triples-based models often drop graphical representations in favor of a textual shorthand notation. They may also extend the scope of their models beyond words or digital artifacts, to depict any object imaginable. Neither adjustment forces a major change to the conceptual modeling approach. Instead, it reflects the high generality of such modeling, and the range of things designated as nodes and meanings of words.

Major problems do exist in this current art of modeling, however, because it is often very difficult to convey, to other people or especially to software, the precise sets of meanings a modeler-maker intends for the specific nodes and arcs selected as thing-identifiers and relation-identifiers in a formal graph or description.

The intended meaning of all nodes and arcs in the graph or description as a whole may let human beings circumvent this problem, by drawing on human talents for handling context, and/or by annotation or documentation that is separately provided. But today's software cannot use either technique yet, and in practice, even among the humans involved, meanings of symbols cause great confusion.

Attempts to solve this problem in other ways focus especially on using additional descriptions and/or graphs—in sets known as "ontologies"—to model symbols that originally needed definition or clarification.

Each ontology takes a considerable effort, but it merely pushes the same basic problem down to a new lower level. Terms and relations in the ontology itself now appear undefined, requiring yet another ontology to be built for them, which in practice is often quite different, and left not produced.

A related problem with ontological approaches is their inconsistency in the definitions they each offer for symbols that humans would perceive as being near-synonyms. With no solid basis for "grounding" the intended meanings of nodes and arcs, it is hard to know how ontologies interrelate.

Such inconsistencies now keep vast amounts of existing data in separate organizations and applications from being used or compared or combined. The data can be read across Internet links, but meanings formally modeled or inferred for contained symbols often show disjoint models too different to be usefully combined.

Identifiers themselves are often assigned so that different ones may actually have similar or identical meanings, yet get assigned in a way that can conceal these similar meanings, not unlike how different word spellings in two different natural languages can hide a similarity in meaning from all speakers who know only one of them.

What the software field needs to cope with this range of problems is a new, better way to define the identifiers for nodes and arcs, for the term-meanings in paragraphs, and for other digital objects.

SUMMARY

Embodiments of the present invention enable a computer to generate, store, transmit, receive, and otherwise process digital models of the semantics of words, grammar forms, paragraphs, graph elements, and other symbols in natural languages and other languages. Such digital models may be used, for example, by software applications where the identification and description of the symbol's semantics (meaning) is of interest.

In particular embodiments of the present invention a data structure referred to herein as a "self-annotating identifier" (SAID) is used to represent the meaning of a symbol. A SAID may, for example, represent answers provided by a user to a set of questions, such as binary (e.g., yes/no) questions, about the symbol's meaning. A SAID may, for example, be represented as a relatively compact set of bits.

In various embodiments of the present invention, a SAID may perform, for example, one or more of the following functions:

(1) To identify a word or other symbol meaning in one or more natural languages—either uniquely or as one of a small set of nearly synonymous terms.
(2) To describe the thing symbolized sufficiently well that native adult human speakers can accurately recall many additional properties of it.
(3) To express both the symbol and its significance in a manner that enables computer software and/or hardware to process the SAID easily and quickly, and to use the SAID readily in decision making, reasoning, and/or modeling.

For example, in one embodiment of the present invention, a computer-implemented method is provided which includes: (A) providing, to a user, representations of a plurality of discriminants of meanings of a plurality of symbols in a natural language, wherein each of the plurality of discriminants is associated with a corresponding finite set of mutually exclusive answers to the discriminant, and wherein the plurality of discriminants are orthogonal to each other; (B) receiving, from the user, input representing a plurality of answers to the plurality of discriminants, wherein each of the plurality of answers from the user is selected from the finite set of mutually exclusive answers to the corresponding discriminant; and (C) generating, in response to the input, a data structure tangibly stored in a computer-readable memory, the data structure comprising data representing the plurality of answers from the user and thereby representing a meaning of one of the plurality of symbols in the natural language.

The finite set of mutually exclusive answers may, for example, consist of exactly two answers. Step (B) may include: (B)(1) receiving first input from the user representing a first answer to a first one of the plurality of discriminants; and (B)(2) receiving second input, independent of the first input, from the user representing a second answer to a second one of the plurality of discriminants.

The plurality of symbols may, for example, include a plurality of words and/or grammar forms in the natural language.

The data structure may be relatively compact. For example, (C) may include generating the data structure to include a plurality of fields, wherein each of the plurality of fields represents a corresponding one of the plurality of answers. The data structure may, for example, include solely the plurality of fields. Each of the plurality of fields may, for example, represent a single bit of information. Each of the plurality of fields may, for example, contain solely information representing the plurality of answers.

The plurality of fields may be relatively limited in number. For example, there may be 4, 6, 8, or 12 fields. The plurality of fields may be represented in a relatively small number of bits in the data structure, such as 8, 16, 24, 32, or 64 bits.

The plurality of discriminants may, for example, include at least two of a discriminant for distinguishing between individual and collective meanings in the natural language, a discriminant for distinguishing between specific and indefinite meanings in the natural language, a discriminant for distinguishing between natural and artificial meanings in the natural language, and a discriminant for distinguishing between concrete and information meanings in the natural language. The plurality of discriminants may, for example, further include at least one of a discriminant for distinguishing between real and imaginary meanings in the natural language and a discriminant for distinguishing between basic and mediating meanings in the natural language.

The plurality of discriminants may include particular combinations of discriminants. For example, the plurality of discriminants may include a discriminant for distinguishing between individual and collective meanings in the natural language and a discriminant for distinguishing between specific and indefinite meanings in the natural language. As yet another example, the plurality of discriminants may include a discriminant for distinguishing between natural and artificial meanings in the natural language and a discriminant for distinguishing between concrete and information meanings in the natural language.

The method may, for example, further include: (D) providing, to the user, a representation of a type tree including a plurality of types. Step (B) may further comprise receiving, from the user, input representing a branch of the type tree selected by the user. Step (C) may further comprise generating a data structure comprising data representing the plurality of answers from the user and the branch of the type tree selected by the user. The data representing the plurality of answers from the user may, for example, consist of at most one byte of data.

Step (C) may further comprise storing, in the data structure, data representing a creation time of the data structure. Step (C) may further comprise storing, in the data structure, the symbol whose meaning is represented by the data structure.

Step (C) may include generating a code for a category set defined by a version of Roget's Thesaurus. Such a code may, for example, be represented, along with part-of-speech subcategory, in not more than 2 bytes.

Other features and advantages of various aspects and embodiments of the present invention will become apparent from the following description and from the claims.

DETAILED DESCRIPTION

Embodiments of the present invention enable a computer to generate, store, transmit, receive, and otherwise process digital models of the semantics of words, grammar forms, paragraphs, graph elements, and other symbols in natural languages and other languages. Such digital models may be used, for example, by software applications where the identification and description of the symbol's semantics (meaning) is of interest.

In particular embodiments of the present invention a data structure referred to herein as a "self-annotating identifier" (SAID) is used to represent the meaning of a symbol. A SAID may, for example, represent answers provided by a user to a set of questions, such as binary (e.g., yes/no) questions, about the symbol's meaning. A SAID may, for example, be represented as a relatively compact set of bits.

Figure 1:
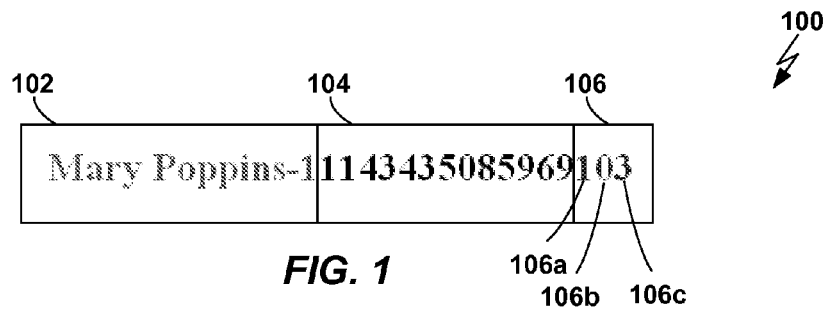
FIG. 1 is an illustration of a self-annotating identifier (SAID) data structure according to one embodiment of the present invention.

For example, referring to FIG. 1, an illustration is shown of an example of a SAID 100 according to one embodiment of the present invention. The contents of the SAID 100, and techniques that may be used to generate and process it, will be described below.

Figure 2:
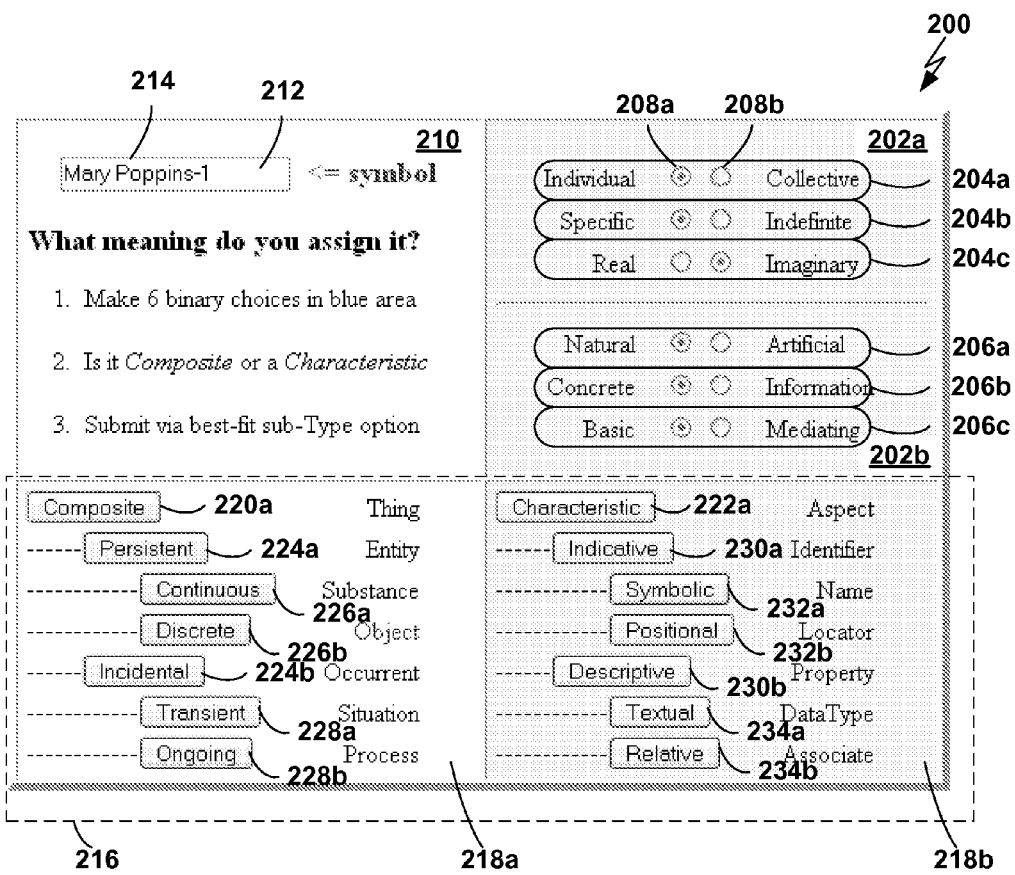
FIG. 2 is an illustration of a screen display used as part of a graphical user interface for generating a SAID data structure according to one embodiment of the present invention.
Figure 3:
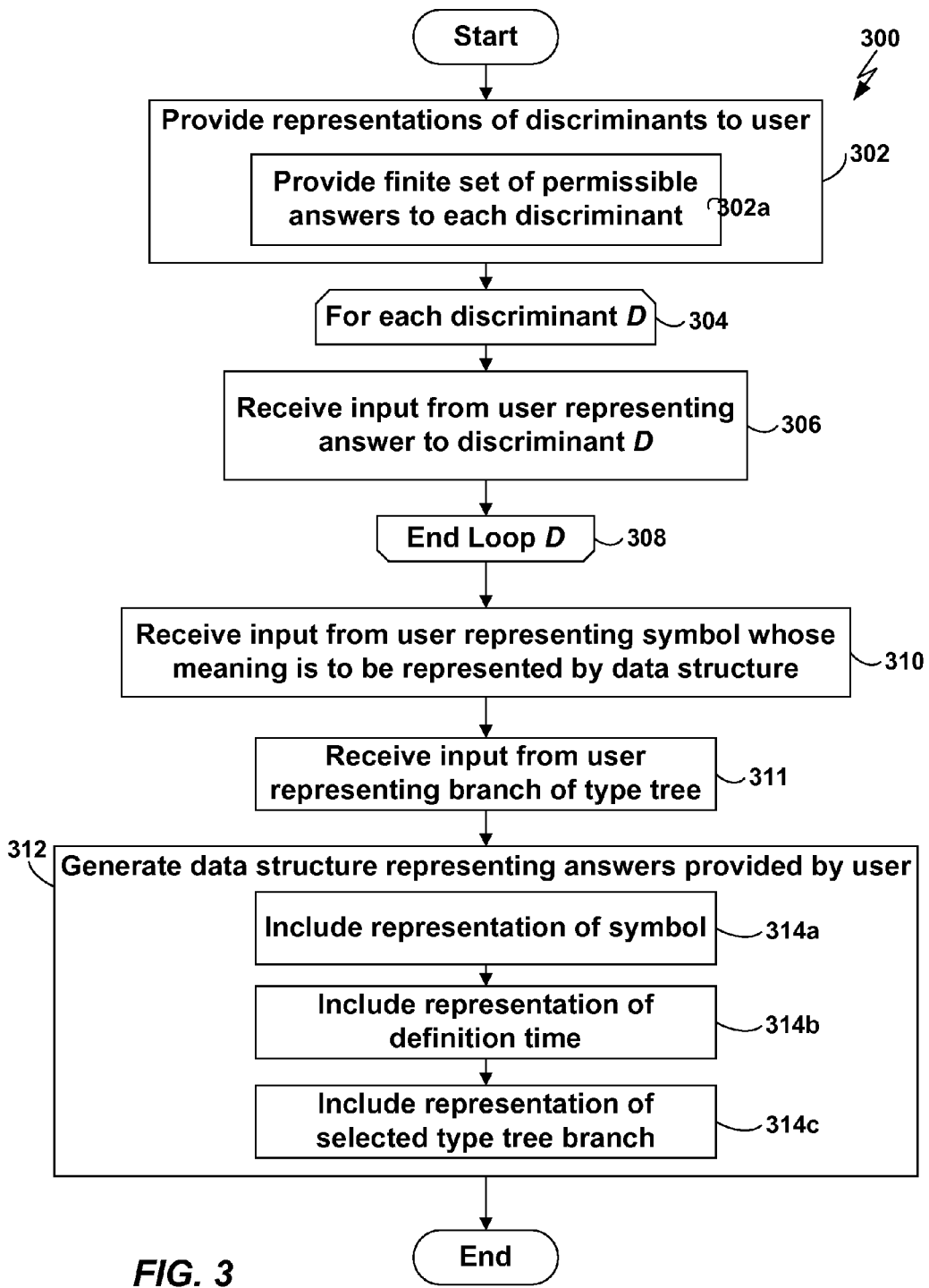
FIG. 3 is a flowchart of a method for generating a SAID data structure according to one embodiment of the present invention.
Figure 4:
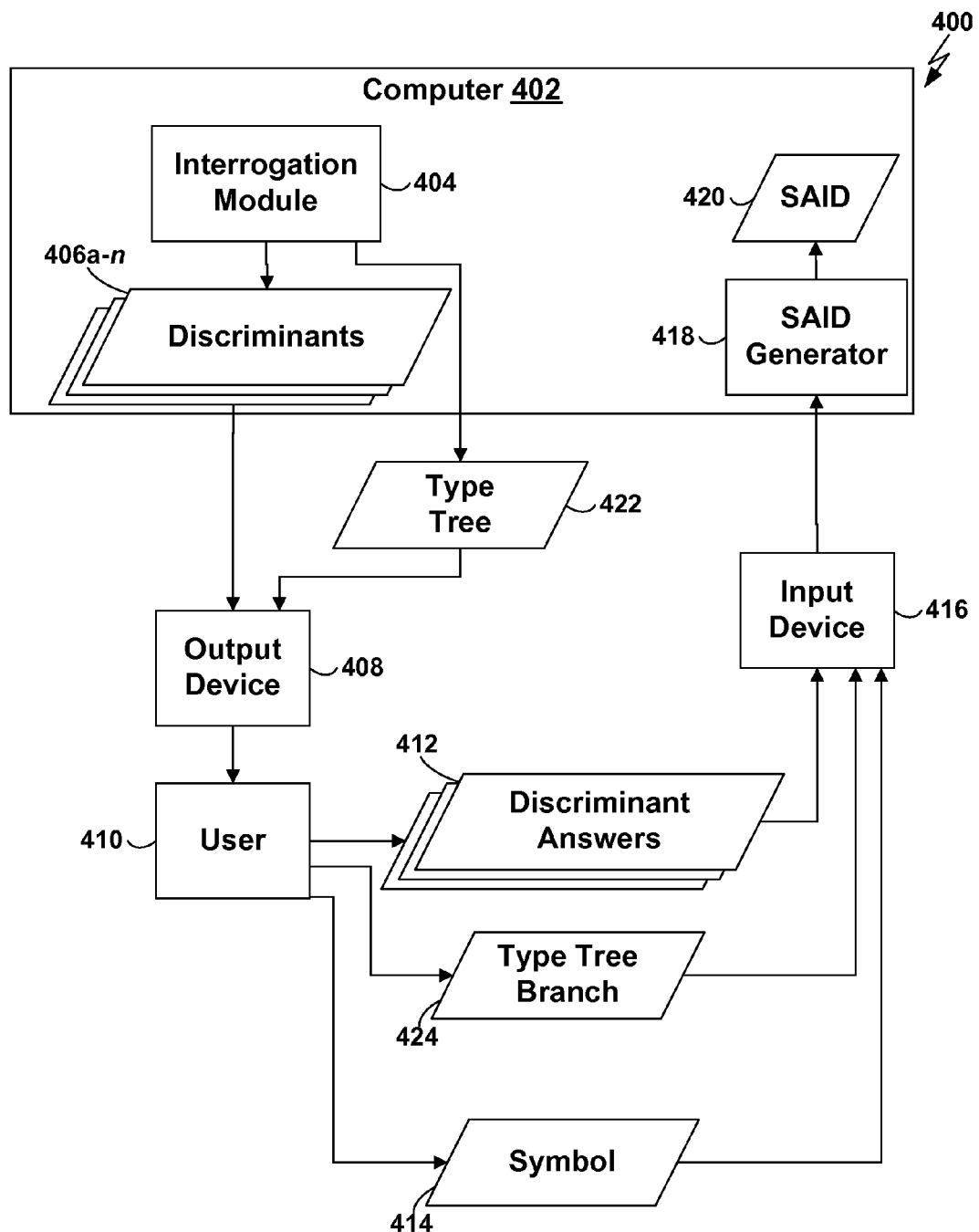
FIG. 4 is a dataflow diagram of a system for performing the method of FIG. 3 according to one embodiment of the present invention.

Referring to FIG. 2, an illustration is shown of a screen display 200 that may be used as part of a graphical user interface for generating a SAID, such as the SAID 100 shown in FIG. 1, according to one embodiment of the present invention. Referring to FIG. 3, a flowchart is shown of a method 300 that may be used to generate a SAID, such as the SAID 100 shown in FIG. 1, according to one embodiment of the present invention. Referring to FIG. 4, a dataflow diagram is shown of a system 400 that may be used to perform the method 300 of FIG. 3 and thereby to generate a SAID, such as the SAID 100 of FIG. 1, according to one embodiment of the present invention.

The system 400 of FIG. 4 includes a computer 402 which includes an interrogation module 404. As will now be described in more detail, the interrogation module 404 receives input from a user 410 specifying a meaning of a symbol in a natural language. The system also includes a SAID generator 418 which generates a SAID data structure 420 including data which represents the meaning of the symbol. Therefore, in the following discussion, the phrase "the symbol whose meaning is to be represented" refers to the symbol ("Marry Poppins-1" in the case of the SAID 100 in FIG. 1) whose meaning the user 410 intends to convey. Similarly, terms such as "the user's intended meaning" and "the meaning to be represented" below refer to the meaning which the user 410 intends to represent in the SAID data structure 420 through the input the user 410 provides to the system 400.

More specifically, the interrogation module 404 uses an output device 408 (such as a display monitor) to provide representations of a plurality of discriminants 406a-n to a user 410 of the computer system 402 (FIG. 3, step 302). Each of the discriminants 406a-n may, for example, be a discriminant of a meaning of a word or other symbol in a natural language.

The screen display 200 shown in FIG. 2 is an example of a mechanism through which the interrogation module 404 may provide the user 410 with representations of the plurality of discriminants 406a-n. For example, box 202a includes textual representations 204a-c of three discriminants: a representation 204a of a first discriminant for distinguishing between an individual meaning and a collective meaning, a representation 204b of a discriminant for distinguishing between a specific meaning and an indefinite meaning, and a representation 204c of a discriminant for distinguishing between a real meaning and an imaginary mean 204c.

Similarly, box 202b includes textual representations 206a-c of three additional discriminants: a representation 206a of a discriminant for distinguishing between a natural meaning and an artificial meaning, a representation 206b of a discriminant for distinguishing between a concrete meaning and an information meaning, and a discriminant 206c for distinguishing between a basic meaning and a mediating meaning 206c.

The interrogation module 404 may, in the course of providing the representations (e.g., representations 204-ac and 206a-c) of the discriminants 406a-n to the user 410, provide to the user 410 (e.g., through the output device 408) representations of a finite set of permissible answers 422 to the discriminants 406a-n (step 302a). For example, assume that representation 204a in FIG. 2 is a representation of discriminant 406a. The representation 204a displays two permissible answers—"Individual" and "Collective"—from which the user 410 may choose an answer by selecting one of two displayed radio buttons 208a-b. In this way, the interrogation module 404 both displays the permissible answers to discriminant 406a to the user 410, and limits the user's range of answers to the choices displayed. In the example screen display 200 shown in FIG. 2, the same technique is applied to the remaining discriminant representations 204b-c and 206a-c.

For each discriminant D in the set of discriminants 406a-n (FIG. 3, step 304), the interrogation module 404 receives input from the user 410 representing an answer to discriminant D (FIG. 3, step 306). For example, in the embodiment illustrated in FIG. 2, the user 410 may select an answer to the discriminant 406a represented by representation 204a by selecting (e.g., clicking on) the appropriate one of the radio buttons 208a-b. More specifically, if the user 410 considers the meaning to be represented to be an "individual" meaning, then the user 410 may provide input in step 306 by selecting radio button 208a. Alternatively, if the user 410 considers the meaning to be represented to be a "collective" meaning, then the user 410 may provide input in step 306 by selecting radio button 208b. In the particular embodiment shown in FIG. 2, the user 410 has selected radio button 208a to indicate that the meaning to be represented (i.e., the meaning of the symbol "Mary Poppins-1" 102) is an "individual" meaning.

Step 306 is repeated for the remaining discriminants 406b-n (step 308). The user 410 thereby provides a set of answers 412 to the discriminants 406a-n.

The interrogation module 404 may solicit and receive additional information from the user 410. For example, the interrogation module 404 may receive input 414 from the user 410 representing the symbol whose meaning is to be represented (step 310). For example, referring again to FIG. 2, the screen display 200 includes a box 210 including a text input field 212 in which the user 410 may provide text representing the symbol whose meaning is to be represented. In the example illustrated in FIG. 2, the user 410 has typed "Mary Poppins-1" 214 in the text input field 212, thereby specifying that "Mary Poppins-1" 214 is the symbol whose meaning is to be represented.

Note that the suffix "-1" may, for example, be provided explicitly by the user 410 or be appended by the interrogation module 404 or SAID generator 414. For example, the suffix "-1" may be appended automatically to the first instance of the symbol "Mary Poppins" encountered by the SAID generator 414, the suffix "-2" may be appended automatically to the second instance of the symbol "Mary Poppins" encountered by the SAID generator 414, and so on.

The user 410 may provide input, such as the discriminant answers 412 and the symbol 414, using any appropriate input device 416, such as a keyboard and/or mouse. The input device 416 provides the user's input to the computer 402, where the input is received by a SAID generator 418. The SAID generator 418 generates a data structure 420 representing the answers 412 provided by the user 410 to the discriminants 406a-n (step 312). The SAID generator 418 may further include in the data structure 420 data representing, for example, the symbol 414 (step 314a) and/or the time at which the data structure 420 is created and/or defined (step 314b).

The result of the method 300 illustrated in FIG. 3, as performed by the system 400 illustrated in FIG. 4, is that the data structure 420 represents the discriminant answers 412 provided by the user 410 and, optionally, the symbol 414 and/or creation time of the data structure 420. As a result, the data structure 420 represents a meaning of the symbol 414 in a particular language intended by the user 410.

The description thus far has referred only to discriminants having answers which are mutually exclusive and independent of each other. The interrogation module 404 may, however, receive additional input from the user 410. For example, referring again to FIG. 2, the interrogation module 404 may, through the screen display 200, provide the user 410 with a representation 216 of a type tree 422 including a plurality of types. The type tree representation 216 in the example of FIG. 2 includes representations 218a-b of first and second branches of the tree, respectively. More specifically, box 218a represents a branch of the tree for "composite" meanings, while box 218b represents a branch of the tree for "characteristic" meanings.

In one embodiment, the user 410 may select one of the two branches, and thereby specify to which of the branches the intended meaning belongs, by selecting (e.g., clicking on) either the composite (thing) button 220 or the characteristic (aspect) button 222a. If the user 410 selects the composite button 220, the user 410 may further select either the persistent (entity) button 224a or the incidental (occurrent) button 224b to specify one further level of meaning within the "composite" branch. If the user 410 selects the persistent 224a button, the user 410 may further select either the continuous (substance) button 226a or the discrete (object) button 226b, to specify yet one further level of meaning within the "persistent" branch. Similarly, if the user 410 selects the incidental button 224b, the user 410 may further select either the transient 228a or ongoing 228b button, to specify yet one further level of meaning within the "incidental" branch. The user 410 may similarly select combinations of the indicative (identifier) button 230a, descriptive (property) button 230b, symbolic (name) button 232a, positional (locator) button 232b, textual (datatype) button 234a, and relative (associate) button 234b to select a particular path through the "characteristic" branch.

By selecting a combination of buttons, the user 410 provides input 424 (FIG. 4) specifying a particular branch of the type tree 422 (FIG. 3, step 311). For example, if the user selects the composite button 220, the persistent button 224a, and the discrete button 226b, the user 410 thereby specifies a branch of the type tree connecting nodes representing composite, persistent, and discrete aspects of meaning.

Alternatively, for example, the user 410 may specify a branch by selecting a single button representing the leaf node of the branch. For example, if the user 410 selects the discrete button 226b, the interrogation module 404 may interpret such input as a selection of the branch connecting the "composite," "persistent," and "discrete" nodes of the type tree.

The user 410 need not specify a branch to any particular depth. For example, the user 410 need not specify any branch of the type tree 422. In other words, the user 410 may solely specify answers 412 to the discriminants 406a-n, in which case the SAID generator may generate the data structure 420 solely to represent the answers 412. The user 410 may, as another example, solely select the persistent button 224a, in response to which the SAID generator 418 may generate the data structure 420 to include the discriminant answers 412 and a type tree branch terminating at the "persistent" node.

Having described various techniques that may be used to generate the SAID data structure 420, the contents of the example SAID data structure 100 illustrated in FIG. 1 may now be described in more detail. The example SAID data structure 100 shown in FIG. 1 is illustrated as a packed character string definition for the name "Mary Poppins." This data structure 100 may, in its entirety, uniquely identify one intended meaning for the name "Mary Poppins," by using a controlled term 102 for the meaning (represented in FIG. 2 by text 214), and describing what the controlled term 102 symbolizes by representing the semantic axioms the meaning obeys in another field 106.

The symbol 102 whose meaning is to be represented is sometimes called a "shape" in lexicography. A common practice is to assign shapes by using a normal spelling for a term, to which is added a number indicating the relative order in which each meaning was formally defined. Used as a locally unique identifier for something the term symbolizes, each shape notates one of the term's "senses," but does not describe them, so the shape 102 is only an optional part of the SAID data structure 100. Furthermore, the particular contents and structure of the shape 102 shown in FIG. 1 are shown merely for purposes of example and do not constitute limitations of the present invention. For example, different shapes of the same symbol may be distinguished from each other in ways other than using the suffixes "-1," "-2," and so on. Furthermore, the symbol itself (e.g., "Mary Poppins") need not be represented in ASCII in the SAID 100, but may rather, for example, be represented in a more compact, even if not human-readable, format.

In the example illustrated in FIG. 1, the SAID data structure 100 includes a field 104 representing an assertion time, which may, for example, be a creation time of the data structure 100. Declaring intended meaning for an identified subject is a deliberate act at a specific time. Recording the time may play an indirect role in SAID semantics, by adding enough bits to make the SAID unique within a namespace. Furthermore, time tags at the millisecond level may make each SAID data structure globally unique across namespaces. They are easy to obtain in computers, which commonly track time as the number of milliseconds elapsed since 1970.

Although the particular data structure 100 shown in FIG. 1 contains several fields 102, 104, and 106, this is merely an example and does not constitute a limitation of the present invention. For example, the data structure 100 may include additional fields not shown in FIG. 1. Furthermore, fields 102 and/or 104 may be omitted from the data structure 100.

Each of some or all of the answers 412 to the discriminants 406a-n may be viewed as corresponding to an "axiom." For example, the answers provided in response to discriminant representations 204a-c and 206a-c, and the user's selection of one of the buttons 220a or 222a in FIG. 2 may define basic rules (axioms) in the mind of their observer (whether human or computer) on the nature of the meaning represented by the data structure 420.

The final three characters 106 in the data structure 100 of FIG. 1 represent basic semantic predicates true of the shape's meaning. In particular, characters 106 represent the answers provided by the user 410 to the "nature"-related discriminants shown in box 202a of FIG. 2, to the "realm"-related discriminants shown in box 202b, and the type tree illustrated in area 216. In particular, character 106a represents the combination of selections made in representations 204a, 204b, and 204c; character 106b represents the combination of selections made in representations 206a, 206b, and 206c; and character 106c represents the combination of selections made in box 216. The input 412 provided by the user 410 may be encoded in the characters 106 in any of a variety of ways. For example, although in FIG. 1 the user input 412 is encoded in ASCII digits, the user input 412 may alternatively, for example, be encoded in bits, such as individual bits corresponding to each of the binary answers 412 provided by the user 410.

Particular combinations of axioms may be useful in a variety of contexts. For example, consider the first two discriminant representations 204a-b shown in FIG. 2. The corresponding axioms may be combined in four possible ways: (1) individual-specific (referred to herein as an "instance"), which denotes one particular example of a thing; (2) individual-indefinite (referred to herein as a "prototype"), which denotes one typical example of a class or set; (3) collective-specific (referred to herein as a "set"), which denotes a number of specific examples; and (4) collective-indefinite (referred to herein as a "class"), which denotes all examples close enough to a thing to count as sufficiently similar to the thing. These four combinations are useful for identifying a wide variety of meanings. To facilitate their use by the user 410, these four combinations may be labeled (e.g., as "instance," "prototype," "set," and "class") in the screen display 200. Furthermore, the interrogation module 404 may enable the user 410 to select one of the four combinations directly (e.g., by selecting one of four corresponding radio buttons), rather than by requiring the user 410 to select the two corresponding axioms individually.

As yet another example, consider the first two discriminant representations in box 202b in FIG. 2. The corresponding axioms may be combined in four possible ways: (1) natural-concrete (referred to herein as "physical"), examples of which are space-time, matter, organisms, and landmarks; (2) natural-information (referred to herein as "signaling"), examples of which are senses, genes, instinct, emotions, and desires; (3) artificial-concrete (referred to herein as "societal"), examples of which are materials, transport, infrastructure, and cities; and (4) artificial-information (referred to herein as "descriptive"), examples of which are models, morals, language, law, art, and ownership.

The interrogation module 404 may solicit and/or receive input from the user 410 specifying the meaning to be represented in yet other ways. For example, the user 410 need not provide input specifying axioms. For example, the user 410 may input and/or select phrase-like summaries of facet meanings.

The axioms and interpretation tap a very powerful indexing technique known as "faceted classification," which is now making resources much easier to find in advanced libraries, web sites, and databases. Instead of using only one taxonomy, this approach classifies concepts simultaneously in several smaller, orthogonal ones called "facets."

Each axiom and facet assertion may be separately added to range or domain constrains, and may be used in faceted queries of the problem space. More flexible than "class" in such usages, they often split up team disagreements into more tractable chunks as well. All of these effects have led well-known authorities on modeling to advocate such techniques in the uppermost layers of ontologies.

Embodiments of the present invention have a variety of advantages. For example, various techniques may be applied to enable the data structure 420 to be relatively small in size. For example, the number of discriminants 406a-n to which the user 410 provides answers 412 may be relatively small. In the embodiment illustrated in FIG. 2, for example, the user 410 is only required to provide answers to six discriminants (represented by 204a-c and 206a-c). The number of discriminants may, however, be even smaller, such as 2, 3, 4, or 5.

The size of the data structure 420 may further be kept small because each of the answers 412 may be represented using a relatively small number of fields, each of which may be represented by a single bit if each field represents an answer to a binary (e.g., yes/no) question. For example, in the case (such as the case illustrated in FIG. 2), here each discriminant has only two permissible answers, the answer to each discriminant may be represented in a single bit. Therefore, in the case where there are, for example, six discriminants, the answers 412 may be represented in the data structure 420 using only six bits. Even if two additional binary discriminants are added, the entire data structure 420 may be represented in eight bits—a single byte.

One advantage of limiting the size of the data structure 420 to a single byte is that a byte is a unit that conventional microprocessors are designed to process efficiently. More generally, the data structure 420 may be designed to have a number of bits equal to the size of a native data type of a microprocessor, such as 16, 32, or 64 bits.

The size of the data structure 420 may further be kept small because the data structure 420 need not incorporate or refer to other data structures or files supplementing the meaning of the symbol 414 represented by the data structure 420. Although the data structure 420 may include additional data, such as the symbol 414 and/or the creation time of the data structure 420, this is not a requirement of the present invention. Rather, the data structure 420 may include solely a plurality of fields (e.g., bits) representing the user-provided answers 412. Therefore, the number of bits in the data structure 420 (or that portion of the data structure 420 representing the answers 412) may be equal to the number of answers 412.

In other words, the data structure 420 may be a compact, self-annotating identifier of the represented meaning of the symbol 414. Such a self-annotating identifier is particularly useful as an identifier for meanings of terms in the English language and other natural languages. Conventional identifiers typically lack a descriptive quality completely, or include a trivial description of an aspect of a symbol, such as some associated time or place.

Even if the data structure 420 further includes data representing a branch of the type tree specified by the user 410, the size of the data structure 420 may still be relatively small. For example, the data structure 420 may represent both answers 412 to the discriminants and the user-specified type tree branch 424 and still occupy no more than one or two bytes.

A related benefit of embodiments of the present invention is that the usefulness of the SAID data structure 420 is not limited to data structures having a particular size or narrow range of sizes. For example, a SAID data structure of a single byte may be useful, as may SAID data structures of 2, 3, or 4 bytes, for example. Although increasing the size of the SAID data structure may increase the clarity of the meaning specified by the data structure and enable it to include related data (such as creation time), even a one-byte SAID may contain sufficient information to be useful for a wide variety of purposes. Even SAID data structures of 4 or more bytes are significantly more compact than a typical computer file, record, or description (one region of a graph or frame model), all of which are commonly used to represent symbol meanings.

Another advantage of embodiments of the present invention is that they may use a relatively small number of discriminants (such as the six discriminants illustrated in boxes 202a-b in FIG. 2) which are generally applicable to meanings of a large class of symbols, such as the class of words in a natural language such as English. Using such a small number of discriminants both simplifies the process of generating data structures for large numbers of symbols in the class (by reducing the number of decisions and amount of input required from the user) and reduces the size of the data structure 420 needed to represent the answers to such discriminants. For example, SAIDs that are only one byte in size can refer to clusters of meanings each roughly 0.4% the size of a typical English speaking vocabulary.

Where more precision is desired, the answers to the small set of discriminants may be combined with answers to additional questions (such as those asked in area 216 of FIG. 2), which may not apply to all objects in the class of symbols being defined. Instead, such additional questions may apply logically only to specific clusters of meanings, in which similar things can be found. This combination of a small number of very generally-applicable questions with questions of narrower applicability, enables SAIDs to specify meanings clearly in a relatively small amount of space.

Furthermore, not all SAIDs in a collection of SAIDs need be of the same size. For example, some may represent answers only to the generally-applicable questions, while others may represent answers to both the generally-applicable questions and to the narrowly-applicable questions. Allowing SAIDs of varying sizes to coexist enables some SAIDs to specify meanings more clearly while limiting the overall size of the collection of SAIDs.

Because SAIDs with similar meanings may have similar bit-compositions, each may semantically associate many other symbols that are associated individually to it. Similarity and difference functions can be used to help integrate, for example, databases whose schema are independently documented or annotated with SAIDs.

Each SAID may be viewed by software as the answers to binary questions about whatever it symbolizes, and may thereby be used directly as predicates for decision making, rule-based programs, reasoning, or analogy.

Because a SAID may be generated in response to binary questions posed to a human being about a meaning and not, for example, about a particular word spelling or phonetics, one SAID may be support the speakers of many natural languages, and help to translate paragraphs among them.

Techniques disclosed herein for SAIDs also work for modeling things signified by a proper name; by technical jargon; or (with limits) by other kinds of symbols such as a logo, photograph, song, pathname, acronym, etc.

Once a collection of SAIDs has been generated, such a collection may be used for a variety of purposes, such as helping to enable man-machine Q&A about SAID-modeled topics, embedded equipment service manuals, analysis of electronic message traffic, situation-awareness software and tools, multilingual semantic lexicons for translators, greatly improved information-retrieval services, enhanced voice processing to and from text, interactive model-based training software, multimedia content indexing and search and UI modules for intelligent agents.

SAIDs may be especially useful in the internet world, where strings of ASCII characters are a common medium of exchange. Particular embodiments of SAIDs may be designed to function well in such a realm, where string lengths are flexible.

SAIDs may also be implemented to pack tightly in RAM for efficient processing and storage by focusing on data items which pack neatly into 1, 2, 4 or 8 byte fields. This matches standard widths of data elements in a modern microprocessor.

A SAID of any packed size may be mapped into equivalent ASCII characters by converting each packed byte to 2 hexadecimal digits. This "external" rendering would be twice the size of packed data, but more compatible with the HTTP data transmission protocols used in the web, and with XML files in any dialect, where SAIDs would be well suited to the identifiers in "tags."

By design, external SAIDs are particularly well suited to identifying the topics, objects, nodes and relations now employed under RDF, RDFS, OWL, XTM and other standards for the types of metadata needed on a Semantic Web, and would be especially well suited to handling what are commonly known as "blank" nodes in those languages.

As described above, a SAID may be generated in response to answers to very general "axiomatic" questions about intended meanings. Such questions may discriminate among things using philosophical abstractions. As a result, these "axioms" are also known as "discriminants."

Information theory suggests a most efficient way to partition a space of all meanings: each axiom should split all meanings into two groups of equal size, and do so independently of all competing axioms. Particular embodiments of the present invention, therefore, use binary axioms, each of which is applicable to all meanings and things to be represented by SAIDs.

A densely packed pattern for SAIDs would be particularly effective if it arose from binary "axiom" questions, which can apply to any word-meaning or thing. The six discriminants represented by elements 204a-c and 206a-c in FIG. 2 are examples of such axiom questions.

The answers to such axiom questions, as represented in the resulting SAID 420, expose bit patterns for SAID-processing software that internally allow for rapid branching, such as in a "switch" or "do-case" construct, thereby leading to logic specific to sets of axioms. This will now be described.

The type tree illustrated in area 216 of FIG. 2 illustrates that "Component versus Characteristic" is not only an axiom, but also governs the next axiomatic questions to be asked, as these main types lead to very different sub-types.

This effect is well known and problematical, for it leads to an explosion of needed axioms. The embodiment illustrated in FIG. 2 shows this, for example, by branching to eight very different sub-types of things to model further, namely: substances, objects, situations, processes (AKA "events"), names, locations, data types, and associates (AKA "relations").

SAIDs can handle this explosion with at least three distinct strategies. The first is the "brute force" technique—gathering subtypes and/or properties for each of the above types by using eight distinct input forms (e.g., web pages). With this strategy, the user 410 would see the correct sub-form and be asked to fill it out whenever one of the eight types listed above were selected. For example, each of such input forms may collect only enough new data to complete SAIDs that packed internally into 16 bits.

In such an embodiment, one 2-byte SAID could internally represent 65 thousand distinct meanings or types of things, at interesting levels of detail, yet it would take no more than twice the work needed for a 1-byte SAID. Adult humans typically possess a vocabulary much smaller than 65 thousand words, most of which do not have large sets of senses. At this level of detail, any vocabulary of SAIDs would thus start to be competitive, in number at least, with all word-meanings in an adult's head.

In another embodiment, the semantic detail of SAIDs may be increased by asking one new question that is applicable to all the sub-types in FIG. 2, namely: in what sub-category of *Roget's Thesaurus* (published version X) does the meaning to be represented best fit? The answer sought here would not be a binary axiom, but a fairly large expansion of the "realm" axioms (box 202b), as a choice of one option from all those in the book's index. It might technically take not just one field or question, but several, to define (besides the category), such as: (1) What version of Roget's Thesaurus?; and (2) What is the intended meaning's part of speech?

A published book code like this relies on the "index of categories" for word meanings found in one specific edition—for example *Roget's Fourth International Thesaurus*, by Harper and Row, 1977. A choice from a user-selected version would be valuable data, easily added to a SAID as a category number.

Roughly 1,000 main categories exist, but they exist in a tree, so a super-category code might best be used in the actual SAID. Its size could be adjusted to fit a bit packing plan—i.e., one of 32 super categories packed into one byte, say, with one of 8 parts of speech. Such options could come from a pull down-list.

Combining a more precise realm with more deeply typed SAIDs can boost the possible meanings cited in a three-byte packed SAID to 16 million, well past vocabulary capacities for adult humans. In web level character strings, this precision takes only 6 base-16 digits. Another byte of Roget's data might then be optionally added to hold an even more detailed sub-category code, along with the specific edition from which it came. Because it would be optional, however, such a byte might better be added only in selected namespaces of SAIDs, as will now be described.

A third strategy for adding detail to SAIDs would make it namespace-specific. This has the advantage that many namespaces can contribute open-ended extensions to the packed SAIDs described above, and it is congruent with both standard XML and Semantic web approaches.

Common and standard practices in web and XML circles view resource IDs as the combination of a "namespace" identifying a set of them, and a "fragment" naming one particular member of the set (which typically gets marked by a preceding '#' in a URI cited a file). SAIDs may be implemented to fit this common pattern of usage for URIs, as advocated by W3C.

As described above, certain discriminants in a SAID (e.g., the first 1-3 packed bytes or 2-6 hexadecimal integers) may effectively work like axioms to bound the range of possible subjects which could be the meaning symbolized by that SAID. Any additional extensions to that baseline may, for example, be namespace specific. They may, for example, be especially valuable in extending the meaning identified by the core fixed bytes.

One such extension is time, depicting to at least the nearest millisecond when the core discriminants of a SAID were formally added to a namespace. This adds 4 bytes at least to SAID internally in RAM, so it is not inexpensive of memory, but time does add useful data.

A less costly and more useful approach may be to record at the character level the registration of the SAID as the meaning of one particular symbol (spelling), as shown in FIG. 1. In it, the digit attached to the word spelling refers to the order of assignment of a particular core SAID to that spelling in the namespace. This enables a popular way to reference specific meaning, and could leave the exact registration time as data needing lookup.

Optional namespace extensions to a SAID may be defined by the namespace publisher to extend only a few particular types, or any specific combinations of type and realm. This is adds broad powers SAIDs seek to facilitate.

Syntactically, extensions may, for example, consist of extra data added to a fixed length SAID, but set off from it, for example, by a period (".") in a character string or by a zero half-byte in packed data. Such extensions may be defined, and an order given if more than one could apply to a SAID. One approach to such definitions is to require public specifications to resolve within the core namespace URI.

One way to extend "data-type" characteristic meanings is to identify a particular format for descriptive text, perhaps by reference to a particular standards document published in a particular namespace. Another is to add Roget categories from specific works. Other references on words can also be cited in this manner.

Such extensions may combine SAIDs with other identifiers already in use. A namespace that focuses on "physical substances", for example, might add to each SAID that it publishes a Chemical Registry symbol found in the document entitled, "CAS REGISTRY and CAS Registry Numbers," available from the Chemical Abstracts Service (CAS), to better identify its subject. There are 27 million such codes, so eight decimal digits would be needed for each. If packed into bits, it require 4 bytes, including a leading half-byte zero. Extension codes for "situation" SAIDs, by contrast, might be published using the Lexikos ontology, as described in the document entitled, "Published Subject Indicators for Situations" on the Lexikos.com Web site. Some of these codes may, for example, extend core SAIDs for "occurrents" and for "associates", and cite expected types of case role combinations for each usage in text.

In embodiments in which the namespace in a SAID must resolve to specs, publishers may comply with this requirement in a variety of ways. One is to offer links to multiple pages, each focused on SAIDs with unique signatures of axioms. If some of those pages are dynamic (executable), they may not only reply with data (like a time of registration), but also do useful things for their related SAIDs, including such services as:

Translation—This downloads the axioms and extension facets of any SAID or sense code in another formal language—like WORDS, LTM or OWL. It is a variation on the namespace CSV file cited earlier, but it can help end-users (or their scripts) convert to a new language their tools demand.

Variations—Via extra arguments, a user may request content changes on such translations. An example is a WORDS model for some verb-meaning SAID, modified by extra arguments which define its mood, tense and complements in an English clause. The return would model the contextual (argument-influenced) clause meaning, not the (baseline) verb sense. In the biochemical realm, a similar variation might be the OWL model of some interaction SAID, modified by the contextual presence of some catalyst(s) or the atypical ionization in some participant(s).

Expansion—Both types of services may work by adjusting JSP templates. Expansions may work similarly, but may graft in additional content present in neither the SAID signature nor the extra arguments.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

For example, in the example illustrated in FIG. 4, the interrogation module 404 and the SAID generator 418 are included in a single computer 402. This is merely an example and does not constitute a limitation of the present invention. For example, the functions performed by the interrogation module 404 may be divided into several computer programs and/or several computers, as may the functions performed by the SAID generator 418. The interrogation module 404 and SAID generator 418, for example, may operate on separate computers. The SAID data structure 420 need not be stored on the same computer as the SAID generator 418.

For example, the user 410 may use a client computer (not shown) to communicate with the computer 402 (which may act as a server) over a network connection. The interrogation module 404 may provide the display screen 200 over the Internet as part of a web page. The SAID generator 418 may transmit the generated SAID data structure 420 to the user 410 over the network connection. These and other implementations of the system 400 illustrated in FIG. 4 will be apparent to those having ordinary skill in the art.

Although in particular examples described herein the SAID data structure 420 represents a meaning of a word or other symbol in a natural language, the data structure 420 may represent a meaning of a symbol in a language other than a natural language. In general, the SAID data structure 420 includes a digital identifier used as a symbol for something in a specified collection (e.g., class or set), sometimes referred to as a "namespace." Examples of non-natural languages include chemical, medical, or engineering notations, mathematical or programming variables, and formal modeling languages such as WORDS, LTM, and OWL.

The particular screen display 200 shown in FIG. 2 is provided merely for purposes of example and does not constitute a limitation of the present invention. Rather, the interrogation module 404 may provide the user 410 with an indication of the inputs required to generate the SAID data structure 420 in any of a variety of ways. For example, the interrogation module 404 may use a textual rather than a graphical user interface to solicit user input. The interrogation module 404 need not display permissible answers to the user 410. For example, the interrogation module 404 may instead prompt the user 410 with an identifier of a category (e.g. "Nature"), in response to which the user 410 may provide input specifying one or more discriminant answers (e.g., by typing "individual" and "specific"). More generally, the user 410 may provide any combination of the answers 412, symbol, and type tree branch specification 424 using textual input.

The particular type tree 422 illustrated in area 216 of FIG. 2 is shown merely as an example and does not constitute a limitation of the present invention. Other type trees may be used. More generally, the type tree 422 is merely one example of a set of questions which may be posed to the user and which includes at least some answers which are dependent on each other. For example, the "persistent" branch of the tree (corresponding to persistent button 224a in FIG. 2) is only relevant if the user 410 selects the "composite" branch of the tree (by selecting button 220a in FIG. 2). In this sense the choice of either the "persistent" branch or the "incidental" branch is dependent on the user's choice of the "composite" branch. The user 410 may be required and/or allowed to provide answers which are dependent on each other in other ways.

Similarly, although the screen display 200 provides a complete and contemporaneous representation of the full set of answers expected from the user 410, this is not required. For example, the interrogation module 404 may first prompt the user 410 for answers to a subset of the discriminants 406a-n (such as by displaying solely the box 202a), in response to which the user 410 may provide answers to the displayed subset of discriminants. The interrogation module 404 may then prompt the user 410 for answers to another subset of the discriminants 406a-n (such as by displaying solely the box 202b), in response to which the user 410 may provide answers to the displayed subset of discriminants.

Similarly, with respect to the type tree or other queries for which answers may be dependent on each other, the interrogation module 404 may selectively prompt the user 410 to provide input based on previous input provided by the user 410. For example, the interrogation module 404 may display solely the composite button 220a and the characteristic button 222a. If the user 410 selects the composite button 220a, the interrogation module 404 may display solely the persistent button 224a and the incidental button 224b to the user 410. In this way, the interrogation module 404 may display additional choices to the user 410 based on the user's previous choices. This is merely one example of determining which information to solicit from the user 410 based on previous input provided by the user 410.

Although in the embodiment described above the interrogation module 404 is described as prompting the user 410 for answers to all of the discriminants 406a-n, this is not a requirement of the present invention. Rather, the interrogation module 404 may prompt the user 410 for answers to fewer than all of the discriminants 406a-n. Whether or not the interrogation module 404 prompts the user 410 for answers to all of the discriminants 406a-n, the SAID generator 418 may be implemented to generate the SAID 420 even if the user 410 does not provide answers to all of the discriminants 406a-n, and even if the SAID generator 418 is not provided with answers to all of the discriminants 406a-n.

In FIG. 4, a plurality of discriminants 406a-n is shown, where n may be any number. In particular applications, however, particular numbers of discriminants may be useful. For example, in the example illustrated in FIG. 2, boxes 202a and 202b include representations 204a-c and 206a-c of only six discriminants. Such a relatively small number of discriminants may represent a large number of meanings with a degree of precision that is sufficient for many purposes. Because each such discriminant may be represented in as little as a single bit, answers to all six such discriminants may be represented in as few as six bits.

Although in the particular example illustrated in FIG. 2 the user 410 has provided answers to all of the discriminants, this may not be required in all embodiments of the present invention. Rather, the interrogation module 404 may, in some embodiments, allow the user 410 not to provide answers to all of the discriminants 406a-n, and may therefore generate the data structure 420 based on answers to fewer than all of the discriminants 406a-n. As another example, one or more of the discriminants 406a-n may have default answers, in which case the default answer to a discriminant may be represented in the data structure 420 if the user 410 does not provide an answer to that discriminant.

The particular grouping of discriminant representations 204a-c and 206a-c in FIG. 2 is shown merely for purposes of example and does not constitute a limitation of the present invention. For example, box 202a includes representations of examples of discriminants indicating the "nature" of the meaning represented, while box 202b includes representations of examples of discriminants indicating the "realm" of the meaning represented. The "nature" category need not include the particular discriminants shown in FIG. 2. For example, the real/imaginary discriminant represented by representation 204c may be removed from the "nature" category. Similarly, the "realm" category need not include the particular discriminants shown in FIG. 2. For example, the basic/mediating discriminant represented by representation 206c may be removed from the "realm" category.

The categories of "nature" and "realm" need not, however, be used. Similarly, further categories may be added. Discriminants need not be sub-divided into categories at all. Some discriminants may be categorized while others remain uncategorized.

As described above, each of the discriminants 406a-n may be associated with a corresponding finite set of permissible answers to the discriminant. Permissible answers to a particular discriminant may be mutually exclusive of each other. For example, in the embodiment illustrated in FIG. 2, each of the illustrated discriminants has permissible answers which are mutually exclusive of each other. For example, in the case of discriminant representation 204a, the answer "individual" is mutually exclusive of "collective." As further shown in the case of all of the discriminants illustrated in FIG. 2, a particular discriminant may have exactly two permissible answers. Such a discriminant may be referred to herein as a "binary" discriminant. A discriminant may, however, have any number of permissible answers.

The interrogation module 404 may or may not require or allow the discriminants 406a-n to be answered in a particular order. For example, in the embodiment illustrated in FIG. 2, although the discriminants 406a-n are illustrated in a particular sequence in the screen display 200, the user 410 may provide the answers 412 to the discriminants 406a-n in any order without affecting the content of the resulting data structure 420. For example, although the user 410 may find it convenient to provide input to the "individual/collective" discriminant representation 204*a* first, followed by the "specific/indefinite" discriminant representation 204*b*, and so on, this is not required. The user 410 may provide answers to the discriminants 406*a*-*n* in any sequence and independently of each other. This is because the particular discriminants illustrated in FIG. 2 are orthogonal to each other.

The techniques described above may be implemented, for example, in hardware, software, firmware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

What is claimed is:

1. A computer-implemented method comprising:
    (A) providing, to a user, representations of a plurality of discriminants of meanings of a plurality of symbols in a natural language, wherein each of the plurality of discriminants is associated with a corresponding finite set of mutually exclusive answers to the discriminant, and wherein the plurality of discriminants are orthogonal to each other;
    (B) receiving, from the user, input representing a plurality of answers to the plurality of discriminants, wherein each of the plurality of answers from the user is selected from the finite set of mutually exclusive answers to the corresponding discriminant, wherein (B) comprises:
        (B) (1) receiving first input from the user representing a first answer to a first one of the plurality of discriminants; and
        (B)(2) receiving second input, independent of the first input, from the user representing a second answer to a second one of the plurality of discriminants; and
    (C) generating, in response to the input, a data structure tangibly stored in a computer-readable memory, the data structure comprising data representing the plurality of answers from the user, including the first answer and the second answer, and thereby representing a meaning of one of the plurality of symbols in the natural language;
    wherein the plurality of discriminants includes at least one Nature-related discriminant and one Realm-related discriminant, wherein Nature-related discriminants include a discriminant for distinguishing between individual and collective meanings in the natural language and a discriminant for distinguishing between specific and indefinite meanings in the natural language, and wherein Realm-related discriminants include a discriminant for distinguishing between natural and artificial meanings in the natural language and a discriminant for distinguishing between concrete and information meanings in the natural language.

2. The method of claim 1, wherein the finite set of mutually exclusive answers to at least one of the plurality of discriminants consists of exactly two answers.

3. The method of claim 1, wherein the plurality of symbols comprises a plurality of words in the natural language.

4. The method of claim 1, wherein the plurality of symbols comprises a plurality of grammar forms in the natural language.

5. The method of claim 1, wherein (C) comprises generating the data structure to include a plurality of fields, wherein each of the plurality of fields represents a corresponding one of the plurality of answers.

6. The method of claim 5, wherein the computer-readable memory comprises a computer-readable memory in a computer including a processor, and wherein (C) comprises generating the data structure to consist of bits equal in number to a number of bits of a data type native to the processor.

7. The method of claim 1, further comprising:
    (D) providing, to the user, a representation of a type tree including a plurality of types;
    wherein (B) further comprises receiving, from the user, input representing a branch of the type tree selected by the user; and
    wherein (C) comprises generating a data structure comprising data representing the plurality of answers from the user and the branch of the type tree selected by the user.

8. The method of claim 7, wherein the data representing the plurality of answers from the user consists of at most one byte of data.

9. The method of claim 1, wherein (C) further comprises storing, in the data structure, data representing a creation time of the data structure.

10. The method of claim 9, wherein (C) further comprises storing, in the data structure, the one of the plurality of symbols.

11. The method of claim 1, wherein (C) comprises generating a code for a category set defined by a version of Roget's Thesaurus, and wherein the code is representable in not more than 2 bytes.

12. The method of claim 1, wherein the plurality of discriminants further includes at least one of a discriminant for distinguishing between real and imaginary meanings in the natural language and a discriminant for distinguishing between basic and mediating meanings in the natural language.

13. The method of claim 1, wherein the plurality of discriminants further includes a discriminant for distinguishing between composite and characteristic meanings in the natural language.

14. The method of claim 1, wherein the Nature-related discriminants further include a discriminant for distinguishing between real and imaginary meanings in the natural language, and wherein the Realm-related discriminants further include a discriminant for distinguishing between basic and mediating meanings in the natural language.

15. The method of claim 1, wherein the data structure is implemented to fit the pattern of a Uniform Resource Identifier (URI).

16. An apparatus comprising:
discriminant representation means for providing, to a user, representations of a plurality of discriminants of meanings of a plurality of symbols in a natural language, wherein each of the plurality of discriminants is associated with a corresponding finite set of mutually exclusive answers to the discriminant, and wherein the plurality of discriminants are orthogonal to each other;
means for receiving, from the user, input representing a plurality of answers to the plurality of discriminants, wherein each of the plurality of answers from the user is selected from the finite set of mutually exclusive answers to the corresponding discriminant, wherein the means for receiving comprises:
means for receiving first input from the user representing a first answer to a first one of the plurality of discriminants; and
means for receiving second input, independent of the first input, from the user representing a second answer to a second one of the plurality of discriminants; and
means for generating, in response to the input, a data structure tangibly stored in a computer-readable memory, the data structure comprising data representing the plurality of answers from the user, including the first answer and the second answer, and thereby representing a meaning of one of the plurality of symbols in the natural language;
wherein the plurality of discriminants includes at least one Realm-related discriminant and one discriminant for distinguishing between composite and characteristic meanings in the natural language, wherein Realm-related discriminants include a discriminant for distinguishing between natural and artificial meanings in the natural language and a discriminant for distinguishing between concrete and information meanings in the natural language.

17. The apparatus of claim 16, wherein the finite set of mutually exclusive answers to at least one of the plurality of discriminants consists of exactly two answers.

18. The apparatus of claim 16, wherein the plurality of symbols comprises a plurality of words in the natural language.

19. The apparatus of claim 16, wherein the plurality of symbols comprises a plurality of grammar forms in the natural language.

20. The apparatus of claim 16, wherein the means for generating comprises means for generating the data structure to include a plurality of fields, wherein each of the plurality of fields represents a corresponding one of the plurality of answers.

21. The apparatus of claim 20, wherein the computer-readable memory comprises a computer-readable memory in a computer including a processor, and wherein the means for generating comprises means for generating the data structure to consist of bits equal in number to a number of bits of a data type native to the processor.

22. The apparatus of claim 16, wherein the means for generating further comprises storing, in the data structure, data representing a creation time of the data structure.

23. The apparatus of claim 22, wherein the means for generating further comprises storing, in the data structure, the one of the plurality of symbols.

24. The apparatus of claim 16, wherein the means for generating comprises means for generating a code for a category set defined by a version of Roget's Thesaurus, and wherein the code is representable in not more than 2 bytes.

25. The apparatus of claim 16, wherein the data structure is implemented as a Uniform Resource Identifier (URI).

26. An apparatus comprising:
discriminant representation means for providing, to a user, representations of a plurality of discriminants of meanings of a plurality of symbols in a natural language, wherein each of the plurality of discriminants is associated with a corresponding finite set of mutually exclusive answers to the discriminant, and wherein the plurality of discriminants are orthogonal to each other;
means for receiving, from the user, input representing a plurality of answers to the plurality of discriminants, wherein each of the plurality of answers from the user is selected from the finite set of mutually exclusive answers to the corresponding discriminant, wherein the means for receiving comprises:
means for receiving first input from the user representing a first answer to a first one of the plurality of discriminants; and
means for receiving second input, independent of the first input, from the user representing a second answer to a second one of the plurality of discriminants; and
means for generating, in response to the input, a data structure tangibly stored in a computer-readable memory, the data structure comprising data representing the plurality of answers from the user, including the first answer and the second answer, and thereby representing a meaning of one of the plurality of symbols in the natural language;
wherein the plurality of discriminants includes at least one Nature-related discriminant and one Realm-related discriminant, wherein Nature-related discriminants include a discriminant for distinguishing between individual and collective meanings in the natural language and a discriminant for distinguishing between specific and indefinite meanings in the natural language, and wherein Realm-related discriminants include a discriminant for distinguishing between natural and artificial meanings in the natural language and a discriminant for distinguishing between concrete and information meanings in the natural language.

27. The apparatus of claim 26, further comprising:
type tree provision means for providing, to the user, a representation of a type tree including a plurality of types;

wherein the discriminant representation means for providing further comprises means for receiving, from the user, input representing a branch of the type tree selected by the user; and wherein the means for generating comprises means for generating a data structure comprising data representing the plurality of answers from the user and the branch of the type tree selected by the user.

28. The apparatus of claim 27, wherein the data representing the plurality of answers from the user consists of at most one byte of data.

29. The apparatus of claim 26, wherein the plurality of discriminants further includes at least one of a discriminant for distinguishing between real and imaginary meanings in the natural language and a discriminant for distinguishing between basic and mediating meanings in the natural language.

30. The apparatus of claim 26, wherein the plurality of discriminants further includes a discriminant for distinguishing between composite and characteristic meanings in the natural language.

31. The apparatus of claim 26, wherein the Nature-related discriminants further include a discriminant for distinguishing between real and imaginary meanings in the natural language, and wherein the Realm-related discriminants further include a discriminant for distinguishing between basic and mediating meanings in the natural language.

32. A computer-implemented method comprising:
   (A) providing, to a user, representations of a plurality of discriminants of meanings of a plurality of symbols in a natural language, wherein each of the plurality of discriminants is associated with a corresponding finite set of mutually exclusive answers to the discriminant, and wherein the plurality of discriminants are orthogonal to each other;
   (B) receiving, from the user, input representing a plurality of answers to the plurality of discriminants, wherein each of the plurality of answers from the user is selected from the finite set of mutually exclusive answers to the corresponding discriminant, wherein (B) comprises:
      (B) (1) receiving first input from the user representing a first answer to a first one of the plurality of discriminants; and
      (B) (2) receiving second input, independent of the first input, from the user representing a second answer to a second one of the plurality of discriminants; and
   (C) generating, in response to the input, a data structure tangibly stored in a computer-readable memory, the data structure comprising data representing the plurality of answers from the user, including the first answer and the second answer, and thereby representing a meaning of one of the plurality of symbols in the natural language;
   wherein the plurality of discriminants includes at least one Nature-related discriminant and one discriminant for distinguishing between composite and characteristic meanings in the natural language, wherein Nature-related discriminants include a discriminant for distinguishing between individual and collective meanings in the natural language and a discriminant for distinguishing between specific and indefinite meanings in the natural language.

33. A computer-implemented method comprising:
   (A) providing, to a user, representations of a plurality of discriminants of meanings of a plurality of symbols in a natural language, wherein each of the plurality of discriminants is associated with a corresponding finite set of mutually exclusive answers to the discriminant, and wherein the plurality of discriminants are orthogonal to each other;
   (B) receiving, from the user, input representing a plurality of answers to the plurality of discriminants, wherein each of the plurality of answers from the user is selected from the finite set of mutually exclusive answers to the corresponding discriminant, wherein (B) comprises:
      (B) (1) receiving first input from the user representing a first answer to a first one of the plurality of discriminants; and
      (B) (2) receiving second input, independent of the first input, from the user representing a second answer to a second one of the plurality of discriminants; and
   (C) generating, in response to the input, a data structure tangibly stored in a computer-readable memory, the data structure comprising data representing the plurality of answers from the user, including the first answer and the second answer, and thereby representing a meaning of one of the plurality of symbols in the natural language;
   wherein the plurality of discriminants includes at least one Realm-related discriminant and one discriminant for distinguishing between composite and characteristic meanings in the natural language, wherein Realm-related discriminants include a discriminant for distinguishing between natural and artificial meanings in the natural language and a discriminant for distinguishing between concrete and information meanings in the natural language.

34. An apparatus comprising:
   discriminant representation means for providing, to a user, representations of a plurality of discriminants of meanings of a plurality of symbols in a natural language, wherein each of the plurality of discriminants is associated with a corresponding finite set of mutually exclusive answers to the discriminant, and wherein the plurality of discriminants are orthogonal to each other;
   means for receiving, from the user, input representing a plurality of answers to the plurality of discriminants, wherein each of the plurality of answers from the user is selected from the finite set of mutually exclusive answers to the corresponding discriminant, wherein the means for receiving comprises:
      means for receiving first input from the user representing a first answer to a first one of the plurality of discriminants; and
      means for receiving second input, independent of the first input, from the user representing a second answer to a second one of the plurality of discriminants; and
   means for generating, in response to the input, a data structure tangibly stored in a computer-readable memory, the data structure comprising data representing the plurality of answers from the user, including the first answer and the second answer, and thereby representing a meaning of one of the plurality of symbols in the natural language;
   wherein the plurality of discriminants includes at least one Nature-related discriminant and one discriminant for distinguishing between composite and characteristic meanings in the natural language, wherein Nature-related discriminants include a discriminant for distinguishing between individual and collective meanings in the natural language and a discriminant for distinguishing between specific and indefinite meanings in the natural language.

* * * * *

UNITED STATES PATENT AND TRADEMARK OFFICE
CERTIFICATE OF CORRECTION

| | | |
|---|---|---|
| PATENT NO. | : 7,962,328 B2 | Page 1 of 1 |
| APPLICATION NO. | : 11/685505 | |
| DATED | : June 14, 2011 | |
| INVENTOR(S) | : Daniel W. Corwin | |

It is certified that error appears in the above-identified patent and that said Letters Patent is hereby corrected as shown below:

On the Title Page, in Item (75), in Inventors, in column 1, line 1, delete "Lenior City," and insert -- Lenoir City, --, therefor.

On Page 2, in column 1, line 15, Item (56), under "Other Publications", delete "Pubblished" and insert -- Published --, therefor.

On Page 2, in column 2, line 3, Item (56), under "Other Publications", delete "Recomendation," and insert -- Recommendation, --, therefor.

Signed and Sealed this
Seventeenth Day of January, 2012

David J. Kappos
*Director of the United States Patent and Trademark Office*